United States Patent [19]
Tresser et al.

[11] Patent Number: 6,101,001
[45] Date of Patent: Aug. 8, 2000

[54] TARGET PATTERNS CONTROLLED ERROR MANAGEMENT

[75] Inventors: Charles Philippe Tresser, Mamaroneck; Chai Wah Wu, Ossining, both of N.Y.

[73] Assignee: International Business Machines Corporation, Armonk, N.Y.

[21] Appl. No.: 09/323,229

[22] Filed: Jun. 1, 1999

Related U.S. Application Data

[62] Division of application No. 08/922,283, Sep. 3, 1997.

[51] Int. Cl.[7] .................................................. G03B 7/091
[52] U.S. Cl. ............................ 358/1.9; 382/252; 382/162
[58] Field of Search .......................... 382/252, 162–167, 382/260, 270; 358/1.9

[56] References Cited

U.S. PATENT DOCUMENTS

| | | | |
|---|---|---|---|
| 5,051,770 | 9/1991 | Cornuejols | 354/432 |
| 5,055,942 | 10/1991 | Levien | 358/456 |
| 5,150,429 | 9/1992 | Miller et al. | 382/50 |
| 5,325,211 | 6/1994 | Eschbach | 358/296 |
| 5,351,312 | 9/1994 | Sato et al. | 382/260 |
| 5,392,211 | 2/1995 | Oe | 382/260 |
| 5,565,994 | 10/1996 | Eschbach | 358/466 |
| 5,668,638 | 9/1997 | Knox | 358/298 |

OTHER PUBLICATIONS

R. Eschbach et al., Error–Diffusion Algorithm With Edge Enhancement, J. Opt. Soc. Am. A/vol. 8, No. 12, Dec. 1991, pp. 1844–1850.
C. Rosenberg, "Measurement–Based Evaluation of a Printer Dot Model for Halftone Algorithm Tone Correction", Journal of Electronic Imaging 2(3), Jul. 1993, pp. 205–212.
R. Hauck et al., "Computer–Generated Holograms with Pulse–Density Modulation", Optical Society of America, vol. 1, No. 1, Jan. 1984, pp. 5–10.
R. Eschbach, "Reduction of Artifacts in Error Diffusion by Means of Input–Dependent Weights", Journal of Electronic Imaging, vol. 2, No. 4, Oct. 1993, pp. 352–358.
Z. Fan, "Stability Analysis of Error Difussion", Proc. ICASSP 93, Apr. 1993, Minneapolis, MN. pp. 321–324.
M. Broja et al., "Stability of Active Binarization Processes", Optics Communications, vol. 60, N. 6, Dec. 1986, pp. 353–358.
K. Knox et al., "Threshold Modulation in Error Diffusion", Journal of Electronic Imaging vol. 2, No. 3, Jul. 1993, pp. 185–192.
T. Pappas et al., "Measurement of Printer Parameters for Model–Based Halftoning", Journal of Electronic Imaging, vol. 2, No. 3, Jul. 1993, pp. 193–204.
T. Pappas et al., "Printer Models and Error Diffusion", IEEE Transactions On Image Processing, vol. 4, No. 1, Jan. 1995, pp. 66–80.
Z. Fan et al., "Limit Cycle Behavior of Error Diffusion", IEEE, 1994, pp. 1041–1045.
P. Stucki, "Multiple Error Correction Computation Algorithm for Bi–Level Image Hardcopy Reproduction Implemented as part of the Digital Image Processing Facility (DIPF)", Zurich Research Laboratory, Feb. 1981, pp. 1–48.
R. Floyd et al., "An Adaptive Algorithm for Spatial Grey Scale", SID 75 Digest, Apr. 1975, pp. 36–38.
G.S. Fawcett et al., "Halftoning Techniques Using Error Correction", Proceedings of the SID, vol. 27, No. 4, 1986, pp. 305–308.

*Primary Examiner*—Thomas D. Lee
*Assistant Examiner*—Stephen Brinich
*Attorney, Agent, or Firm*—Whitham, Curtis & Whitham; Stephen C. Kaufman, Esq.

[57] ABSTRACT

A system and method to print grey scale or color images using fewer colors of ink than in the original image. This method distributes the error made at each point (due to the embodied approximation) to the neighbors of that point while obtaining some chosen predetermined patterns for several colors kor grey levels. Getting these predetermined patterns and essentially predetermined patterns for all colors in turn reduces the anisotropic algorithmic artifacts, suppresses edge over-enhancement and allows for good performances on patches of uniform and almost uniform colors or grey levels.

7 Claims, 2 Drawing Sheets

| $a_4$ 1 | $a_3$ 2 | $a_2$ 3 | $a_3$ 4 | $a_4$ 5 |
|---|---|---|---|---|
| $a_3$ 6 | $a_2$ 7 | $a_1$ 8 | $a_2$ 9 | $a_3$ 10 |
| $a_2$ 11 | $a_1$ 12 | CURRENT PIXEL | | |

TARGET PATTERNS CONTROLLED ERROR MANAGEMENT

CROSS-REFERENCE TO RELATED APPLICATION

This application is a division of co-pending patent application Ser. No. 08/922,283 filed Sep. 3, 1997.

BACKGROUND OF THE INVENTION

1. Field of the Invention

The present invention generally relates to halftoning techniques in printers and, more particularly, to a system and method to print grey scale or color images using fewer colors of ink than in the original image.

2. Background Description

Most printers today can print in only a limited number of colors. Halftoning is a technique for printing a picture (or more generally displaying it on some two-dimensional medium) with small dots of a limited number of colors such that it appears to consist of many colors when viewed from a proper distance. For example, a picture of black and white dots can appear to display grey levels when viewed from some distance.

Error diffusion, as first described in "An Adaptive Algorithm for Spatial Greyscale" by R. W. Floyd and L. Steinberg, *Proceeding of the SID* 17/2, pp. 75–77 (1976), is a popular technique for halftoning used today and is considered to be one of the best, and the best among the techniques with similar operating time. This technique and others are reviewed in the book *Digital Halftoning*, MIT Press, Cambridge, Mass. (1987), by R. Ulichney which is a general reference for digital halftoning.

The operation of error diffusion basically spreads the error occurring at a given pixel across neighboring pixels. The spreading of the error is described by an ordered set of numbers called filter coefficients forming together an error filter. At each point, the input image data is combined with the diffused error and a printing decision is made according to some threshold. After Floyd and Steinberg, supra, other filters were proposed, in particular by J. F. Jarvis, C. N. Judice and W. H. Ninke in "A Survey of Techniques for the Display of Continuous Tone Pictures on Bilevel Displays", *Computer Graphics and Image Processing*, Vol. 5, pp. 13–40 (1976), and by P. Stucki "MECCA—A Multiple-Error Correction Computation Algorithm for Bi-Level Image Hardcopy Reproduction", IBM Res. Rep., RZ1060 (1981). Stucki also considers the problem of compensating for actual black dot sizes and shapes, which is important since the basic method assumes square black and white dots of the same size while, in practice, printed dots are not square and overlap neighboring pixels. Filter coefficients are chosen as positive in practical implementations presented so far, but negative values have been considered for special effects and for theoretical studies, for instance in "Stability of Active Binarization Processes", *Opt. Commun.*, 60, pp. 353–358 (1986), by M. Broja, R. Eschbach, and O. Bryngdahl.

Error diffusion has been further enriched, for instance, by varying the threshold in order to cluster dots or to reduce artifacts, for instance, in "Halftoning Techniques Using Error Correction", *Proceedings of the SID*, Vol. 27/4, pp. 305–308 (1986), by G. S. Fawcett and G. F. Schrack, in U.S. Pat. No. 5,055,942 to R. L. Levien, in U.S. Pat. No. 5,150,429 to R. L. Miller and C. M. Smith, or in U.S. Pat. No. 5,325,211 to R. Eschbach. Error diffusion has also been enriched by varying the filter according to grey regions and compensating for the problems hereby introduced, in order to reduce artifacts, for instance in "Computer-generated Holograms with Pulse-density Modulation", J. Opt. Soc. A1 (1984) 5–10, by R. Hauck and O. Bryngdhal, or in "Reduction of Artifacts in Error Diffusion by Means of Input-dependent Weights", *J. El. Imag.* 2(4) (1993) 352–358, by R. Eschbach. These further enrichments, however, fail to correct all problems associated with error diffusion methods.

In all variations of error diffusion, the pixels are processed one at a time following some sequential raster ordering. Because of this sequential processing, the resulting operation is asymmetric, in the sense that it treats pixels differently depending on where they are in the sequential ordering. The results of this are anisotropic algorithmic artifacts, resembling "worms", occurring in the halftoned picture. This is one of the major drawbacks of error diffusion. Several partial solutions have been proposed to this major problem, in particular in the references cited above.

Error diffusion does not allow for good representation for most uniform greys and, in particular, fails to generate most of the pleasant periodic patterns generated by passive methods which use a dithering mask. Furthermore, periodic patterns are usually rather avoided, as discussed for instance in "Limit Cycle Behavior of Error Diffusion", *Proceedings ICIP* 94 Vol. 2, pp. 1041–1045 (1994), by Z. Fan and R. Eschbach, because they are hard to mix with aperiodic textures which contain worms.

The way uniform greys are rendered is mostly unpredictable when using error diffusion methods as described in the prior art. This induces bad representation of most uniform greys which in turn reduces contour definition and forces a trade-off between contour definition and trying to suppress undesirable artifacts such as lines at the boundary of an otherwise almost uniformly colored region, as reported for instance in "Error-diffusion Algorithm with Edge Enhancement", *J. Opt. Soc. Am.*, A8, pp. 1844–1850 (1991), by R. Eschbach and K. T. Knox, or in "Threshold Modulation in Error Diffusion", *J. El. Imag.*, 2(3), pp. 185–192 (1993), by K. T. Knox and R. Eschbach. The unpredictability of the rendering of uniform greys also makes it harder to calibrate according to printer performances as discussed for instance in "Measurement of Printer Parameters for Model-based Halftoning", *J. El. Imag.*, 2(3), pp. 193–204 (1993), by T. N. Pappas, C. K. Dong, and D. L. Neuhoff or in "Measurement based Evaluation of a Printer Dot Model for Halftone Algorithm Tone Correction", *J. El. Imag.*, 2(3), pp. 205–212 (1993), by C. J. Rosenberg, making it preferable to use model-based error diffusion as described for instance in "Printer Models and Error Diffusion", *IEEE Transactions on Image Processing*, 4(1), pp. 66–80 (1995), by T. N. Pappas and D. L. Neuhoff.

SUMMARY OF THE INVENTION

It is therefore an object of the present invention to provide a form of error management in printer outputs which allows one to correct the problems recognized in the prior art.

Providing error diffusion which allows representation of uniform greys and periodic patterns and providing a predictable rendering of uniform greys solves most problems previously described. This method goes beyond "error diffusion" and provides error management which involves a combination of diffusion and anti-diffusion of the error, based on the discovery that although negative filter coefficients are to be avoided in simple implementations, they can be quite beneficial if handled with care and are used only for selected greys or colors. Also, instead of using just one or several error filters adjusted to grey areas or color families as has been done before, we construct essentially as many filters as colors or greys to be rendered. The collection of filters is obtained by interpolating between a few of them which are constructed to give good results on some selected greys or colors. Furthermore, the threshold is adjusted to generate the best results.

The filter weights and the threshold are modified depending on the printer characteristics. The filter weights and threshold are also modified according to color mixing information and the decisions to print a dot or not to print a dot on previously processed pixels.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a diagram illustrating an arrangement of coefficients for the error filter in the architecture of FIG. 1.

DETAILED DESCRIPTION OF A PREFERRED EMBODIMENT OF THE INVENTION

Figure 1:
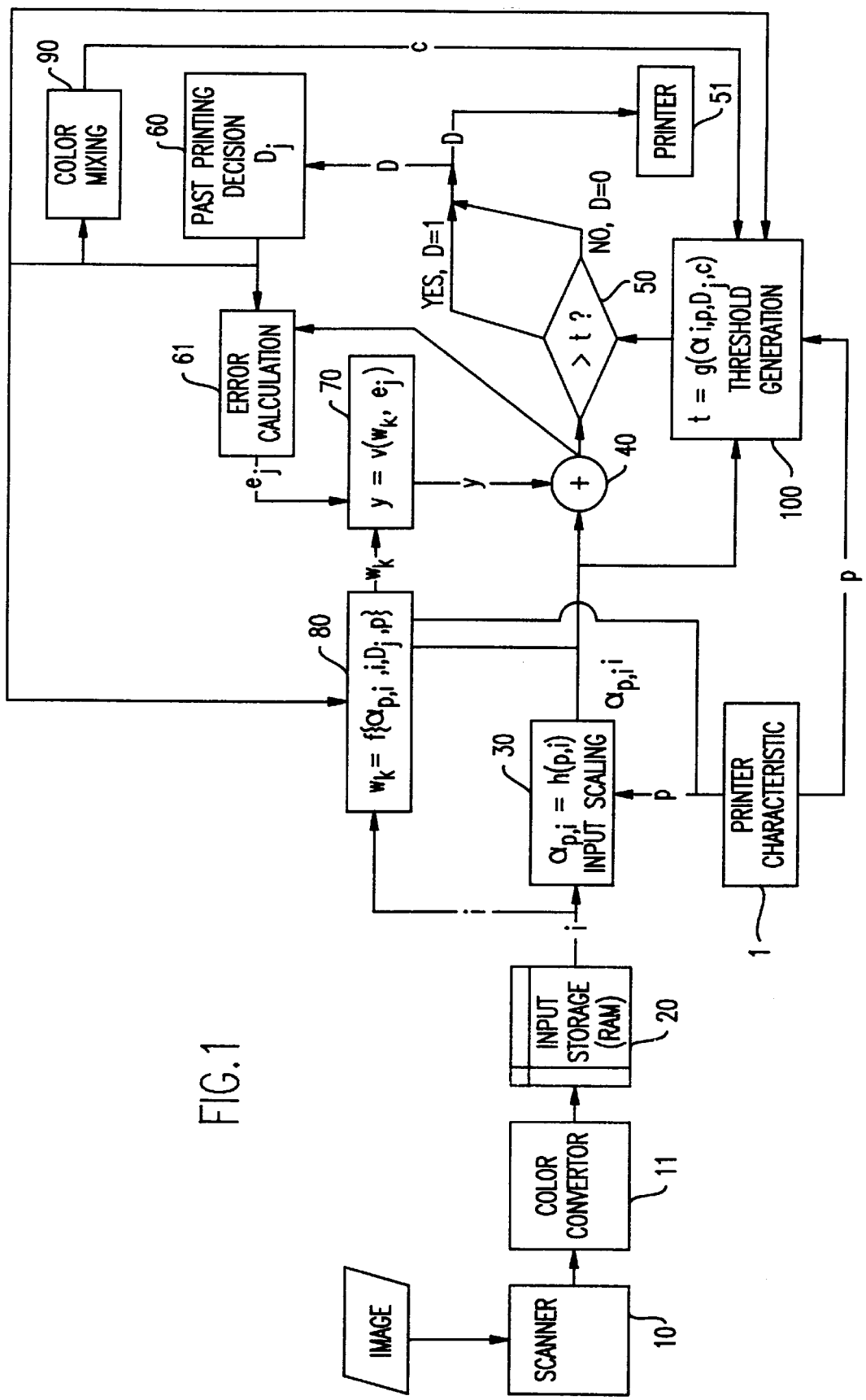
FIG. 1 is a flow chart of the architecture of the system which implements the preferred embodiment of the invention.

Referring now to the drawings, and more particularly to FIG. 1, there is shown the architecture of the system which implements the method according to the preferred embodiment of the invention. All data about some Continuous Tone (CT) source image (I) is stored in the image Random Access Memory (RAM) 20. In the preferred embodiment of an image printed on paper, the data from the image (I) is acquired using a scanner 10 and passed through color converter 11.

In the case of a color image, a Red, Green, Blue (RGB) splitter is used to decompose the image into three monochromatic components, followed usually by a RGB-YMCK (Yellow, Magenta, Cyan, Black (generally express as "K")) converter if the purpose of the invention is to print on paper. All these operations are done at the level of the color converter 11. However, if the image is acquired as a table of data, or is in grey scale, or the output is some form of screen rather than paper, part of the equipment shown in FIG. 1 is not needed in an implementation.

The output of the image RAM 20 is an input signal i for each pixel (m, n) of I, where m and n refer respectively to the horizontal and vertical coordinates of the pixel being treated. In the case of a color image, i also depend on the component, say YMCK, being treated, but in the sequel, grey scale images are assumed, and we indicate modifications for color when needed. The invention makes a decision to print or not to print a black dot at the pixel (m, n) of the printed image I'. In the case of color images, the decision is to print a color dot (in the limit set of colors RGB or YMCK) or not. All decisions are made to solve the problems previously mentioned. In the case of a grey scale image, i=−1 represents white, i=+1 represents black, and a value between −1 and +1 represents intermediate shades of grey.

The signal i is multiplied in the scaler 30 with a scaling factor $\alpha_{p,i}=h(p,i)$ which depends on the printer (or screen) characteristics p determined at 1 and on i. The scaling $\alpha_{p,i}$ is determined by the function h and serves to compensate for the non-idealities in the printing process. Two types of non-linearities are treated by such scaling. First, the dots are not square. Thus, the ink in one pixel can overlap other pixels. Such overlap can be calculated or approximated and the corresponding correction determined. Second, in xerographic printers, the printed dots sizes have a specific probability distribution, depending in particular on whether the printed dots are isolated. Such probability can be approximated to determine h. One way to determine the function h is as follows. For a series of grey levels $G_k$ giving nice predictable patterns, one measures the actual printed renderings, which yields grey levels $G_k'$. h is such that $\alpha_{p,G_k'}G_k'=G_k$, the other values being determined by interpolation.

The scaled input signal $\alpha_{p,i}i$ is used in four places. It is first of all used in the decision block 50, to decide whether to print a black dot or not after adding the propagated errors in summer 40. Next, it is used in calculator 80 in conjunction with the printing decisions $D_j$ stored in 60 and with the printer characteristics p to determine the weights $w_k=f(\alpha_{p,i},D_j,p)$ used to weight the past errors. It is also used in threshold generator 100, in conjunction with the printer characteristics p, and the array 60 of previous printing decisions $D_j$, to determine the threshold $t=g(\alpha_{p,i},i,p,D_j)$ for the output at (m,n) (in the color under consideration in case of a color picture). For instance, if no clustering is intended, g can be chosen as constant. In the case of a color picture, t will also depend on color mixing information c which is determined in function block 90. Finally, $\alpha_{p,i}i$ is used in error calculation 61 (after being added to y in summer 40) in conjunction with the printer characteristics p and the array 60 of previous printing decisions $D_j$, to determine the errors $e_j$ on printing decisions until the present time. In the preferred embodiment, the error $e_j$ is calculated in error calculator 61 as $y+\alpha_{p,i}i-D_j$.

The propagated errors added to $\alpha_{p,i}i$ in summer 40 are determined in calculator 70 as $y=v(w_k,e_j)$, in accordance to the error weights $w_k$ from weighting calculator 80 and an array of past errors generated by error calculator 61. For instance, the function v can be chosen to be a weighted sum $(y=\Sigma_k w_k e_j-k)$ such as in usual error diffusion.

The weights $w_k=f(\alpha_{p,i}i,D_j,p)$ are determined in weight calculator 80 according to $\alpha_{p,i}i$, the printing decisions $D_j$ and the printer characteristics p so as to give predetermined patterns for a specific set of greys. This set of greys is chosen such that a pleasant periodic or blue noise-like pattern exists with the same average grey level as the unscaled input i. These patterns might contain clusters if preferable according to the printer characteristic p. The choices of weights are made in advance to generate this pattern or something close to it. For instance, in the dispersed case, where no cluster formation is intended, an example-where the weights only depend on the scaled input $\alpha_{p,i}i$ is given as shown in Table 1 below. The threshold t is chosen to be zero. The correspondence between the $w_k$s and $a_1$, $a_2$, $a_3$, and $a_4$ for the example in Table 1 is given in FIG. 2.

TABLE 1

| $\alpha_{p,i}i$ | $a_4$ | $a_3$ | $a_2$ | $a_1$ |
|---|---|---|---|---|
| 0 | 1/42 | 2/42 | 4/42 | 8/42 |
| +1/8 | 0.05 | 0.056 | 0.086 | 0.166 |
| ±1/5 | 0.024 | 0.022 | 0.114 | 0.204 |
| ±1/4 | 0.001 | 0.061 | 0.081 | 0.215 |
| ±1/3 | −0.086 | −0.18 | 0.298 | 0.35 |
| ±3/8 | 0.02 | −0.06 | 0.12 | 0.36 |
| ±2/5 | 0.124 | −0.092 | 0.082 | 0.396 |

TABLE 1-continued

| $\alpha_{p,i}i$ | $a_4$ | $a_3$ | $a_2$ | $a_i$ |
|---|---|---|---|---|
| ±4/9 | 0.104 | −0.004 | −0.008 | 0.42 |
| ±1/2 | 0.01 | −0.016 | 0.102 | 0.318 |
| ±3/5 | 0.072 | −0.018 | 0.146 | 0.172 |
| ±5/8 | 0.08 | −0.096 | 0.184 | 0.244 |
| ±2/3 | −0.01 | 0.042 | 0.122 | 0.182 |
| ±3/4 | −0.092 | 0.028 | 0.174 | 0.188 |
| ±7/9 | −0.084 | 0.076 | 0.102 | 0.288 |
| ±15/16 | −0.012 | 0.02 | 0.134 | 0.204 |

The weights in Table 1 are chosen so that all the $\alpha_{p,i}i$ values in the left column yield nice patterns of greys. It is one of the advantages of this invention to be able to generate that many nice, uniform grey patterns by error diffusion. The error weights for the grey levels not listed in the table are computed by some interpolation method, for instance linear interpolation between two entries in the table.

The threshold t is also chosen to generate the proper pattern given $\alpha_{p,i}i$. The operation yielding t in threshold generator 100 is by means of either a simple linear function or, for better performance, a table lookup allowing clustering of points if needed according to $\alpha_{p,i}i$ and p, with preference for some shapes of clusters, and proper color combination according to color mixing function 90. Again, Some predetermined colors are chosen so that the color information c generated by color mixing function 90 leads to predetermined periodic color patterns by adjusting t besides $w_i=f(\alpha_{p,i}i,D_j,p)$. For example, if no clustering is desired, t can be chosen to be constant. The sum of y and $\alpha_{p,i}i$ is compared with the threshold t in decision block 50 to generate the printing decision D. D=1 if $y+\alpha_{p,i}i>t$, and D=−1 otherwise. D is then setn to function block 51 to instruct the printer to print a black dot (D=1) or not (D=−1).

The technique of the invention is to use essentially as many filters as there are levels of grey or numbers of colors to be halftoned. The filters are chosen to give a nice (periodic or close to periodic) patterns at several grey levels, $G_i$. The patterns chosen are such that the nonperiodic patterns which correspond to the other grey levels can be combined nicely with the periodic (or close to periodic) patterns corresponding to the grey levels, $G_i$. If desired, the threshold may be modulated to generate clustered dots.

While the invention has been described in terms of a single preferred embodiment, those skilled in the art will recognize that the invention can be practiced with modification within the spirit and scope of the appended claims.

Having thus described our invention, what we claim as new and desire to protect by Letters Patent is as follows:

1. An error management method for printing comprising the steps of:

using a combination of diffusion and anti-diffusion, including negative filter coefficients which are used only for selected greys or colors, to construct as many filters as colors or greys to be rendered by interpolating between a few filters which are constructed to give good results on some selected greys or colors; and processing an image signal through the filters and adjusting a threshold to generate printer decision signals.

2. An error management method for printing as recited in claim 1 further comprising the step of modifying filter weights and the threshold depending on the printer characteristics.

3. An error management method for printing as recited in claim 2 further comprising the step of modifying the filter weights and threshold according to color mixing information and decisions to print a dot or not to print a dot on previously processed pixels.

4. The error management method for printing recited in claim 1 wherein the filters are chosen to give periodic or close to periodic patterns at several grey levels.

5. The error management method for printing recited in claim 4 wherein the patterns given by said filters for several grey levels are intermingled with nonperiodic, patterns corresponding to remaining grey levels, resulting in all grey levels having a chosen pattern.

6. The error management method for printing recited in claim 1 further comprising the step of modulating the threshold in order to generate clustered dots in a printed image.

7. The error management method for printing as recited in claim 4, wherein said filters for several grey levels are interpolated to give filters for remaining grey levels.

\* \* \* \* \*